Sept. 9, 1969  R. H. ROHMER  3,465,527
SYSTEM FOR THE UNDERGROUND STORAGE OF LIQUIDS
Filed March 11, 1968

INVENTOR
RICHARD HEATH ROHMER
BY
ATTORNEY

United States Patent Office 3,465,527
Patented Sept. 9, 1969

3,465,527
SYSTEM FOR THE UNDERGROUND STORAGE OF LIQUIDS
Richard H. Rohmer, 74 Sandringham Drive, Toronto 12, Ontario, Canada
Filed Mar. 11, 1968, Ser. No. 712,019
Int. Cl. B65g 5/00; E21f 17/16
U.S. Cl. 61—.5                                    4 Claims

ABSTRACT OF THE DISCLOSURE

A system for the underground storage of liquids and the easy transfer of the storage means from one location to another in which the storage tank is placed vertically in a shaft.

PRIOR APPLICATION

This application is similar to my prior application Ser. No. 703,629, filed on the 7th day of February 1968. That application describes and claims a structure wherein the storage tank is placed inside a tapered casing, the casing being anchored in the hole or shaft. The casing and tank are oriented in a vertical plane. The advantages to be gained by the invention are fully set forth in the said prior application.

DESCRIPTION OF INVENTION

The present invention relates to an improvement on the structure disclosed in my said prior application and has certain advantages thereover, namely, it is simpler and less expensive to manufacture and requires a simpler method of installation.

The system for the underground storage of liquids, in accordance with the present invention comprises, in combination:

(a) A substantially vertical shaft in the surface of the earth;
(b) A liquid storage tank removably housed in said shaft, said storage tank having its vertical wall tapering inwardly from the top to the bottom thereof, said tank having its top end spaced below ground level;
(c) A lining of finely divided material between the side and bottom walls of the tank and the walls of said shaft and filling the space thereabove;
(d) Ballast material retaining said tank in said shaft against being lifted by external forces of nature; and
(e) An anti-friction member between said ballast material and the opposing wall of the tank to prevent abrasion of said opposing wall.

The method of installing the system for the underground storage of liquid according to the present invention comprises the steps of:

(a) Preparing a vertical shaft in the surface of the earth;
(b) Placing in said shaft a storage tank of a diameter and height less than the diameter and height of the shaft, said tank being tapered inwardly from the top and to the bottom thereof;
(c) Applying ballast to the tank to prevent it being lifted by the external forces of nature;
(d) Placing an anti-friction material between the tank and the ballast; and
(e) Filling the space between the tank and the shaft and above the tank to ground level with a finely divided material.

The underground system of the present invention is described in the following disclosure aided by the accompanying drawings in which.

Figure 1:
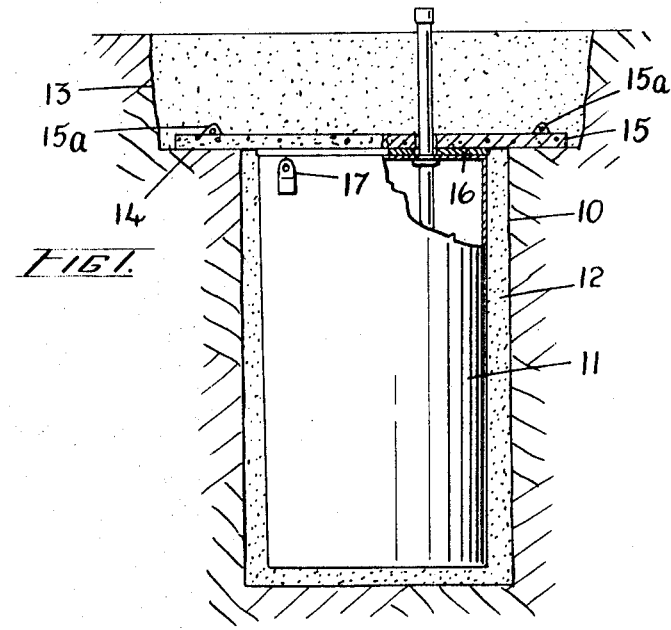
FIGURE 1 is a vertical cross section of the underground storage system illustrating one embodiment of the invention.
Figure 2:
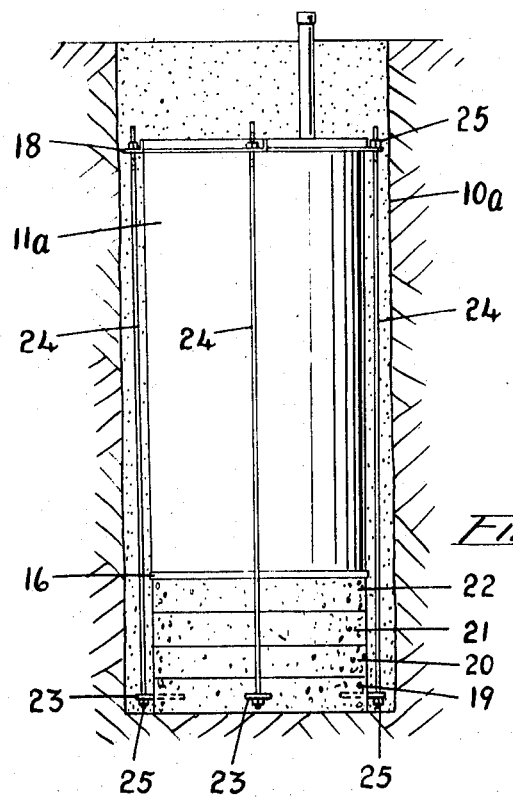
FIGURE 2 is a vertical cross section of an alternative embodiment of my invention.

Whether the embodiment shown in FIGURE 1 or FIGURE 2 is used, the first step is to prepare a vertical shaft 10 by conventional means such as by hand or by an auger of a size, which will have a diameter somewhat larger than the underground storage tank which is to be accommodated therein in a vertical position with its related parts. The depth of the shaft is sufficient to house the tank and its related parts as hereinafter described. The shaft must be vertical.

There is installed in the shaft 10 a metal storage tank 11 which is formed with a slight taper so that the walls of the tank 11 converge inwardly towards the bottom. The taper should not be less than three inches from top to bottom for a casing having an overall length of 20'. The diameter of the tank is substantially less than the diameter of the shaft. By way of illustration only, it is mentioned that if the top end of the tank 11 is eight feet in diameter, the bottom of the tank will be about three inches narrower in diameter. Tanks having different diameters may be employed but in each case the taper will be in the same ratio as that given above or approximately the same. The purpose of this taper is to make the removal of the tank from the hole easy and without distorting the same.

Referring now to the embodiment shown in FIGURE 1, the tank 11 is somewhat smaller than the shaft 10 to provide a space therearound which is filled with a finely divided material 12, such as sand. The top end of the shaft is provided with a widened portion 13 to form a shoulder 14 which supports ballast 15 across the top of the tank. In this construction the ballast 15 may be in the form of a concrete slab which is provided with lifting hooks 15a to which may be attached the hook of a hoist for raising and lowering the concrete slab as required. The shoulder 14 is slightly above the top of the tank to accommodate the cushion 16 which may be in the form of a sheet of fibre board or may be made of other suitable material. The cushion completely covers the top of the tank and protects the top against the abrasive action which might be caused by the movement of the slab 15.

Adjacent the top of the tank 11 are lifting lugs 17 by means of which the tank may be lowered into or lifted out of the shaft 11 for installation or removal.

It will be observed that in this construction the weight of the ballast 15 is carried on the shoulder 14 so that, normally, no load is carried on the tank. It is only when a lifting force, such as the force that might be applied by the raising of the water table in the shaft, will the ballast apply a counter force to resist an upward movement of the tank.

The modification illustrated in FIGURE 2 will now be described. The shaft 10a is similar to the shaft 10 (FIGURE 1). The tank 11a is similar to the tank 11 (FIGURE 1) and is provided with lifting eyes or lugs 18 which project outwardly from the top of the tank with the eyes looking down.

To prevent the tank being lifted by external forces such as water beneath the tank, ballast, in the form of, in the present illustration, four concrete discs 19, 20, 21, and 22, is placed in the bottom of the shaft 11a as shown. Each disc is provided with a lifting hook (not shown) to which can be attached to the hook of a hoist whereby the discs can be lowered into the casing when being installed or raised therefrom when it is desired to move the storage tank to another site. The lowermost concrete slab 19 is provided with outwardly projecting eyes or lugs 23 which have the eyes in alignment with the eyes of the lugs 12. When installed the tank and discs are tied together by the tie-rods 24 and nuts 25. It will be seen fro mthe drawings that the tie-rods pass through the respective eyes of the lugs 12 and 23 and are locked in position by the nuts 25.

The manner of installing the system illustrated in FIGURE 1 is briefly as follows. The shaft 10 with the widened portion 13 is prepared in any conventional manner by means of an auger or by means of hand digging or a combination of the two. A lining of saind 12 is placed on the floor of the shaft and the tank 11 is lowered into the shaft with the bottom standing on the sand lining. The space between the tank sides and the shaft are then filled with sand. If desired the sand can be compacted in the conventional manner so that the tank is firmly held in position. The cushion 16 is then placed in position on the top of the tank unless it has been previously attached. The ballast 15 is then placed in position over the cushion 16 with its rim being supported on the shoulder of the widened portion 13. The widened portion 13 is then filled to grade level. To remove the tank, the material 13 and ballast 15 are removed. Enough of the sand 12 which is around the top of the tank is removed to expose lugs 17. The hooks of a crane can be attached to the lugs and the tank easily lifted out of the shaft.

The modification illustrated in FIGURE 2 will be described.

The first step, of course, is to prepare the shaft 10a. In this specific instruction, no widened portion is required. The concrete slab 19 is first inserted with the tie-rods 24 in position, the lower ends of the tie-rods being attached to their respective lugs 23. The remainder of the concrete slabs 20, 21, 22 are then placed in position on top of one another. The anti-friction cushion 16a is then placed on the top surface of the uppermost slab 22 and the tank then lowered into position. The tie-rods 24 which project upwardly through the eyes of the lugs 23 are entered through the eyes of the lugs 12 and fastened in position by the bolts 25. All spaces surrounding the tank are filled to grade level with sand.

Removal of the tank shown in FIGURE 2 is quite simple. The top fill is removed and the nuts 25 exposed. The upper nuts 25 are then removed which permits the tank to be raised out of the shaft. The cushion 16a can then be removed giving access to the lifting hooks on the respective discs of which the ballast is made. The discs can then be removed by attaching the hook of an hoisting machine to the lifting hooks on the discs. When all of the equipment has been removed the hole or shaft can be filled in with material to a grade level.

What I claim is:

1. A system for the storage of liquids in an underground vertically oriented tank comprising in combination:

(a) a substantially vertical shaft in the surface of the earth;
  (b) a liquid storage tank removably housed in said shaft, said storage tank having its vertical wall tapering inwardly from the top to the bottom thereof, said tank having its top end spaced below ground level;
  (c) a lining of finely divided material between the side and bottom walls of the tank and the walls of said shaft and filling the space thereabove;
  (d) ballast material retaining said tank in said shaft against being lifted by external forces of nature; and
  (e) an anti-friction member between said ballast material and the opposing wall of the tank to prevent abrasion of said opposing wall.

2. A system for the storage of liquids according to claim 1 in which the ballast material comprises a plurality of solid and heavy plate-like members of a size less than the diameter of the casing, each disc-like member situated in the bottom of the shaft, the lowermost of said members having connecting means projecting outwardly from the edge thereof, and connecting lugs secured to the tank adjacent the top end thereof and a detachable link connecting the said connecting means and the lugs.

3. A system for the storage of liquids according to claim 1 in which the ballast material comprises a removable slab of concrete which bears against the top of the tank and the anti-friction member consists of a sheet of cushioning material between the top of the tank and the slab.

4. A system for the underground storage of liquids and the easy transfer of the storage means from one location to another comprising the steps of:

(a) preparing a vertical shaft in the surface of the earth;
  (b) placing in said shaft a storage tank of a diameter and height less than the diameter and height of the shaft, said tank being tapered inwardly from the top to the bottom thereof;
  (c) applying ballast to the tank to prevent it being lifted by the external forces of nature;
  (d) placing an anti-friction material between the tank and the ballast; and
  (e) filling the space between the tank and the shaft and above the tank to ground level with a finely divided material.

References Cited

UNITED STATES PATENTS

| | | | |
|---|---|---|---|
| 2,286,221 | 6/1942 | Merolle | 220—10 |
| 2,501,762 | 3/1950 | Davis | 220—18 |

PETER M. CAUN, Primary Examiner